United States Patent [19]

Price et al.

[11] 4,198,574

[45] Apr. 15, 1980

[54] TIMING CONTROL CIRCUIT

[75] Inventors: Edward G. Price, Salt Lake City; Lewis C. Rasmussen, Bountiful, both of Utah

[73] Assignee: Beehive International, Salt Lake City, Utah

[21] Appl. No.: 892,373

[22] Filed: Mar. 31, 1978

[51] Int. Cl.² ............... H01H 43/04; G05B 19/02
[52] U.S. Cl. .............................. 307/97; 307/117; 307/132 E; 315/156
[58] Field of Search ................ 307/141–143, 307/400, 96, 97, 117, 132 E, 293; 58/145; 315/156, 157

[56] References Cited

U.S. PATENT DOCUMENTS

| | | | |
|---|---|---|---|
| 3,440,347 | 4/1969 | Spencer | 307/117 |
| 3,961,183 | 6/1976 | Dubot | 307/117 |

*Primary Examiner*—Michael L. Gellner
*Assistant Examiner*—S. D. Schreyer
*Attorney, Agent, or Firm*—Thorpe, North & Gold

[57] ABSTRACT

A timing control circuit for use in automatically and intermittently operating electrical appliances, such as lamps, for security purposes in homes, offices and other buildings. The circuit is adapted to plug into a conventional wall socket and to receive conventional two-prong plugs of electrical appliances. When enabled, the circuit intermittently applies power from the wall socket to a connected electrical appliance so that the appliance is turned on and off automatically over some period of time. The circuit includes manually operable switches to enable a user to select the intermittency or on-off pattern of operation of the appliance and the period of time over which such pattern is developed. Controlling turn-on and turn-off of lamps, radios, or the like gives the appearance of occupancy of a dwelling and therefore discourages would be burglars and prowlers.

11 Claims, 3 Drawing Figures

TIMING CONTROL CIRCUIT

BACKGROUND OF THE INVENTION

The present invention relates to timing control apparatus for automatically controlling the turn-on and turn-off of electrical appliances for the purpose of giving the appearance of occupancy of a dwelling.

Concern for the maintenance of safety and security of homes and businesses has led to the development of various timing devices for automatically turning on and turning off electrical appliances such as lamps. Such automatic control of electrical appliances gives the appearance of occupancy of the home or business and thus discourages prowlers from undertaking to improperly enter the premises. Merely leaving lights on all night would most likely be interpreted as an indication that the occupants are absent from the premises since no change would occur in the condition of the premises.

Currently available timing control devices are typically quite large and bulky because of the use of electromechanical timers and mechanically operated on-off switches. Also, usually only one turn-on and one turn-off are possible during any twenty-four hour period.

SUMMARY OF THE INVENTION

It is an object of the present invention to provide a new and improved timing control device for use in controlling operation of electrical appliances.

It is another object of the invention to provide such a device which utilizes solid state circuitry and is compact and lightweight.

It is still another object of the invention to provide such a device which has the capability of automatically and intermittently turning on and turning off electrical appliances a number of times in a twenty-four hour period.

It is an additional object of the present invention to provide such a device which may be programmed to automatically control the turn-on and turn-off of a lamp in accordance with one of several selectable patterns or sequences.

It is a further object of the present invention to provide such a device whose turn-on and turn-off times may be manually selected by the user.

The above and other objects of the invention are realized in a specific illustrative embodiment of a timing control circuit which includes a plug for insertion into a conventional electrical wall outlet, and a socket for receiving a conventional electrical plug of a lamp or other electrical appliance. The timing control circuit automatically controls the application of power from the wall outlet to the socket to thereby control operation of the appliance which is plugged into the socket. The control circuit further includes a manual switch by which the user can select one of several patterns for turning on and turning off the associated electrical appliance. That is, different patterns of on time and off time can be selected by simply setting the manual switch. Then, for a certain "operate" period of time, the electrical appliance is intermittently turned on and off, and for a successive "idle" period of time the appliance remains off. This overall cycle is repeated for each twenty-four hour period.

In accordance with one aspect of the invention, the control circuit is provided with another manual switch by which one of several "operate" periods can be selected. In accordance with another aspect of the invention, the control circuit is provided with a photocell to initiate operation of the "operate" period when the ambient light level in the room in which the control circuit is located falls below a certain predetermined level. In this manner, the control circuit is operable only during the dark hours when safety and security measures are most needed.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
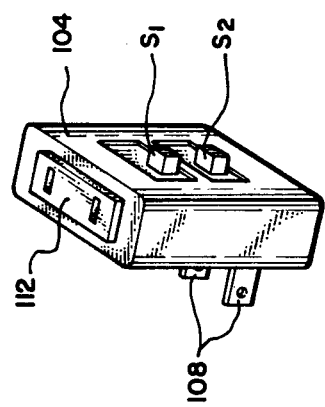
FIG. 1 shows a perspective view of a timing control device made in accordance with the principles of the present invention.

FIG. 1 is a perspective view of a timing control device made in accordance with the present invention. The device includes a box-like housing 104 in which is contained the electrical circuitry shown in FIG. 2. Extending from one side of the housing 104 are a pair of prongs 108 which comprise a conventional plug for plugging into a conventional electrical wall outlet. On a different side of the housing 104 is a conventional two prong socket 112 for receiving the plug of an electrical appliance whose operation is to be controlled by the device.

On still another side of the housing 104 are a pair of three-position slide switches $S_1$ and $S_2$. As will be described in detail later, switch $S_1$ is used for choosing one of three possible on-off patterns for operating an associated electrical appliance. That is, setting of the switch $S_1$ determines the pattern or sequence of the times during which power is applied from the prongs 108 to the socket 112 and thus to the electrical appliance, and the times during which no power is applied to the electrical appliance. Switch $S_2$ determines the individual on times and off times and thus the overall period of time over which the on-off patterns are produced. Switch $S_2$ may be set in one of three positions to thereby establish one of three "operate" periods during which the on-off pattern selected by switch $S_1$ will be generated. Although slide switches are shown for the device of FIG. 1, it should be understood that any of a variety of different type switches could be used including rotatable switches, toggle switches, etc. Also, more or less than three possible on-off patterns and three possible "operate" periods could also be provided if desired.

Figure 2:
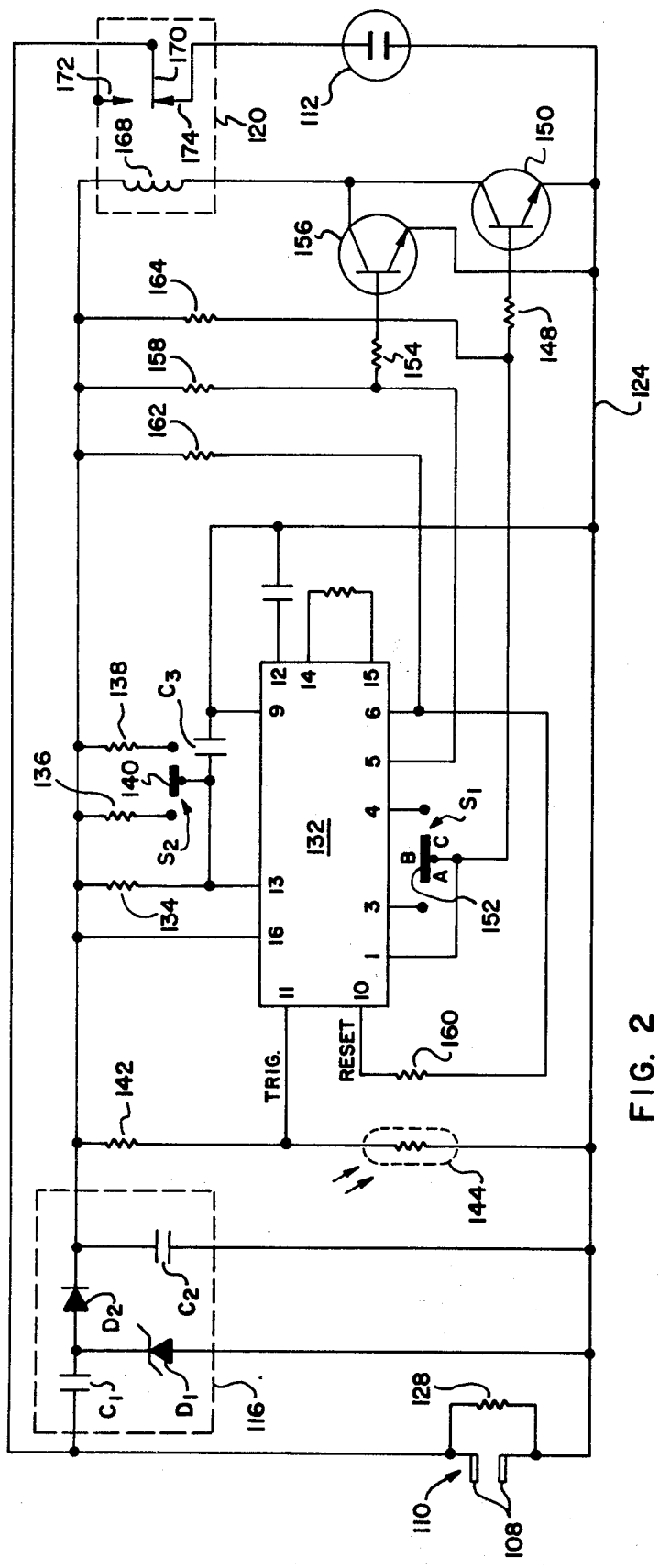
FIG. 2 is a circuit schematic of the timing control device of FIG. 1.

FIG. 2 shows a schematic of an illustrative timing control circuit adapted to control the application of power from an input plug 110 to an output socket 112. The plug 110 includes prongs 108 which correspond to the socket 112 shown in FIG. 1.

One of the prongs 108 is coupled to an A.C. to D.C. power supply 116 and also to a relay switch 120. The other prong is connected to a ground or neutral line 124. A resistor 128 is coupled across the prongs 108 to provide a discharge path for charge accumulated on a capacitor $C_1$. The socket 112 is coupled between the relay switch 120 and the neutral line 124.

The A.C. to D.C. power supply 116 is of conventional design and includes a capacitor $C_1$ coupled in series with a diode $D_2$. Also included is a Zener diode $D_1$ coupled between the junction of the capacitor $C_1$ and the diode $D_2$ to the neutral line 124. A capacitor $C_2$ is coupled between the cathode of the diode $D_2$ and the neutral line 124. The power supply 116 serves to provide half wave rectification of A.C. signals applied to the plug 110 from a wall outlet into which the plug is inserted.

The power supply 116 is coupled by various leads to a programmable time-delay integrated circuit 132 which is adapted to produce a plurality of pulse trains on each of a plurality of output terminals labeled 1, 3, 4, 5 and 6, with the period of each pulse train being different from the period of any other pulse train. The integrated circuit 132 might illustratively be a Fairchild mA 2240 circuit which includes a time base oscillator, a programmable eight-bit counter, and control flip-flops. It should be understood that other oscillator, frequency divider networks could also be used in place of the integrated circuit 132.

An input terminal labeled 13 of integrated circuit 132 receives current from switch $S_2$ to determine the periods of the output pulse trains of the circuit. The switch $S_2$ includes an RC network of resistors 134, 136 and 138 and a capacitor $C_3$. Also included in the switch $S_2$ is a slider element 140 for coupling either resistor 136, resistor 138, or neither to the input terminal 13 of the integrated circuit 132. Resistor 134 is always coupled to this input terminal. By moving the slider element 140, one of three different resistances can be selected for coupling to the input terminal 13 and thus three different current levels can be selected for application to the integrated circuit 132 to determine the periods of the output pulse trains.

The integrated circuit 132 also includes a trigger input terminal 11 and a reset input terminal 10. The trigger input terminal is coupled by way of a resistor 142 to the output of the power supply 116. Coupled in series with the resistor 142 is a photocell 144 whose resistance varies depending upon the amount of light impinging upon the photocell. If the amount of light increases, then the resistance decreases and vice versa. As will be explained later, the photocell controls application of a "trigger" signal to the trigger input terminal 11 to thereby control initiation of operation of the circuit. The reset terminal 10 is coupled to output terminal 6 which periodically supplies a "reset" signal. The reset signal serves to reset the integrated circuit 132 to an idle state to await input to another trigger signal.

The output terminals 1, 3 and 4 of the integrated circuit 132 are coupled to the switch $S_1$ which, in turn, is coupled via a resistor 148 to the base of a transistor 150. The switch $S_1$ includes a slider element 152 for coupling either the output terminal 3 to the base electrode of the transistor 150 (position "A"), neither output terminal 3 or 4 to the transistor 150 (position "B"), or the output terminal 4 to the transistor 150 (position "C"). Output terminal 1 of the circuit 132 is always coupled to the transistor 150. As indicated earlier, the setting of switch $S_1$ determines the particular turn-on and turn-off pattern of an electrical appliance connected to the circuit of FIG. 2.

Output terminal 5 of the integrated circuit 132 is coupled by way of a resistor 154 to the base of another transistor 156, and also by way of a resistor 158 to the output of the power supply 116. The output terminal 6, as indicated earlier, is coupled by way of a resistor 160 to the reset input terminal 10, and also by way of a resistor 162 to the output of the power supply 116. A resistor 164 is coupled between the output of the power supply 116 and the switch $S_1$. The transistors 150 and 156 control the flow of current through a coil 168 of the relay switch 120 to thereby control the flow of current from the plug 110 through the relay switch 120 to the socket 112. Specifically when current is flowing through the coil 168, an armature 170 of the relay switch 120 is attached to an upper contact element 172 to thereby break the circuit between the plug 110 and the socket 112. When no current is flowing through the coil 168, the armature 170 is maintained in contact with a contact element 174 so that the circuit between the plug 110 and the socket 112 is closed. A brief description of the operation of the circuit of FIG. 2 will now be given.

When the plug 110 is plugged into a wall outlet, and an electrical appliance such as a lamp is plugged into the socket 112, power is supplied by the power supply 116 to the integrated circuit 132. If a certain amount of light is impinging on the photocell 144 so that the photocell is highly conductive and the voltage level at the trigger input terminal 11 is *below* a predetermined triggering level, the integrated circuit 132 supplies high outputs to the output terminals 1, 3, 4, 5 and 6. The high outputs on output terminals 1 and 5 respectively cause transistors 150 and 156 to turn on so that current is allowed to flow through relay coil 168. This causes the relay switch 120 to open so that no power is supplied to the socket 112.

When the light level decreases to a certain point, the resistance of the photocell 144 increases and raises the voltage level at the trigger input terminal 11 to the predetermined triggering level, the integrated circuit 132 is triggered into operation. The circuit 132 then produces on the output terminals 1, 3, 4, 5 and 6 the wave forms or pulse trains shown in FIG. 3 (identified by the output terminals or pins upon which the pulse trains appear).

Figure 3:
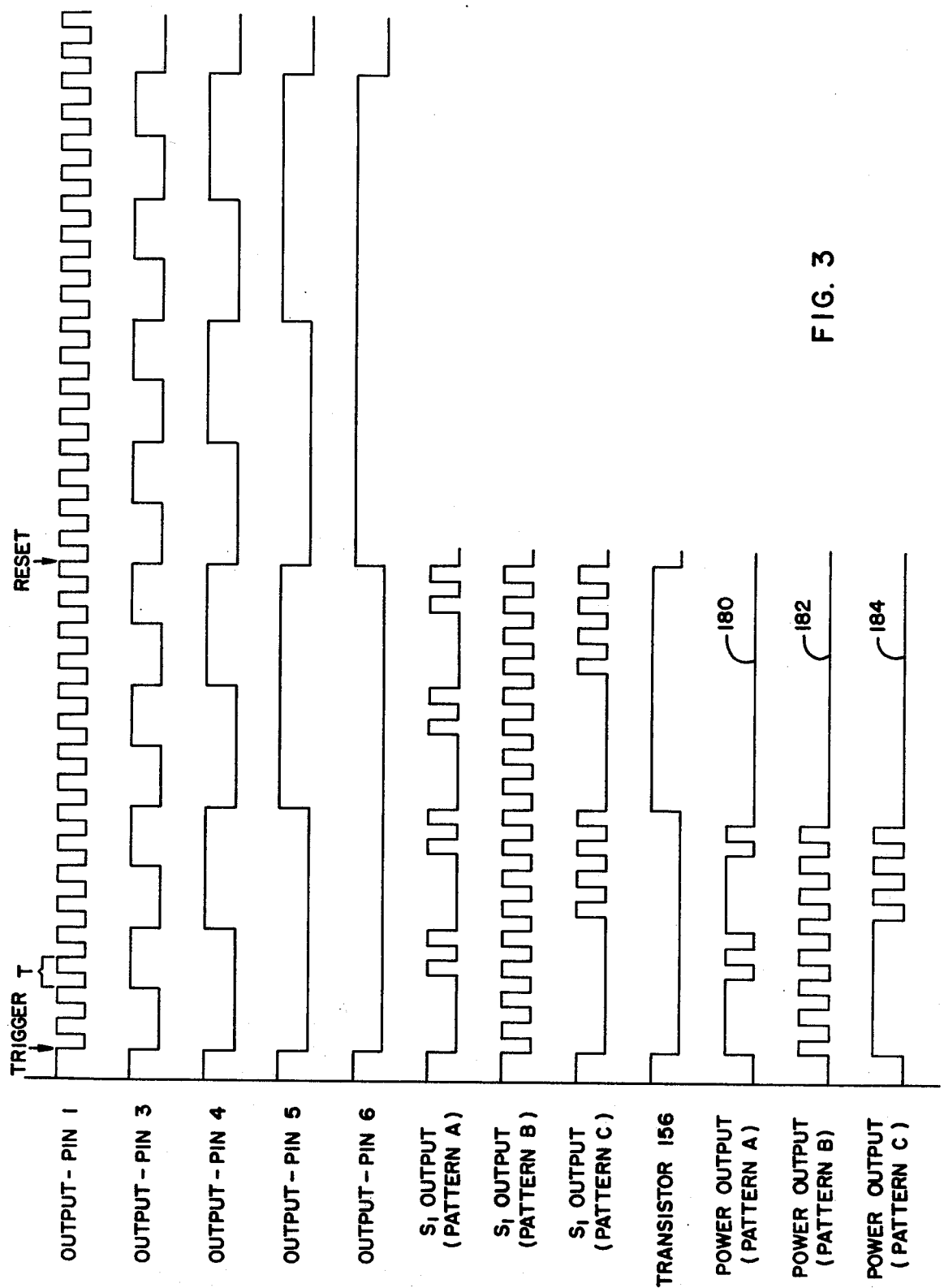
FIG. 3 is a timing diagram for the various outputs of the circuit shown in FIG. 2.

As indicated in FIG. 3, the period of the pulse train on output terminal 1 is T, the period on output terminal 3 is 4T, the period on output terminal 4 is 8T, the period on output terminal 5 is 16T and the period on output terminal 6 is 32T. The value of T is determined by positioning the slider element 140 in one of the three positions described earlier. The resistors 136 and 138 have different resistances to allow different current levels to be supplied to input terminal 13 when such resistors are connected to the terminal. This, in turn, determines the RC time constant of the circuitry of switch $S_2$ and thus the period T. Determining the base period T also determines the overall cycle time of the integrated circuit 132. Exemplary values for T are 30, 44, and 60 minutes.

The setting of switch $S_1$ determines what type of pulse train is applied to the transistor 150 to thereby initially control the application of power from the plug 110 to the socket 112 and thus control the on-off pattern of the appliance which is plugged into the socket 112. Since, upon triggering the integrated circuit 132, the output of pin 5 is made low (see FIG. 3), transistor 156 is turned off so that it will not effect the opening of the relay switch 120. If switch $S_1$ is in position "B", then only the output from terminal 1 is supplied to the transistor 150. The output, shown as "$S_1$ Output (Pattern B)" in FIG. 3, is a pulse train having a period of T so that the output on the terminal is alternately high for a time T/2 and low for a time T/2. During the times that the output terminal 1 is high, the transistor 150 is turned on to conduct current from the power supply 116 through the coil 168 to the neutral line 124. The relay switch 120 is thus caused to open during the time. When the output of terminal 1 is low, transistor 150 is turned off so that relay switch 120 is caused to close to conduct current from the plug 110 to the socket 112.

If switch S₁ is in position "A", then both output terminals 1 and 3 are coupled to the transistor 150. In this configuration, the circuit 132 operates to produce a combined output which is low as long as any one of the individual outputs is low, and to produce a high output only if both of the individual outputs are high. This, in effect, provides a logical AND function output. The combined output for terminals 1 and 3 is illustrated as "S₁ Output (Pattern A)" in FIG. 3 and, as there shown, the combined output is low for 2½ periods T, high for ½ of a period, low for ½ of a period, high for ½ of a period, low for 2½ periods, etc. Of course, during the times that the combined "pattern A" output is low, the transistor 150 is nonconductive so that the relay switch 120 is closed to supply power to the electrical appliance plugged into the socket 112.

Finally, switch S₁, when in position "C", connects output terminals 1 and 4 of the integrated circuit 132. The combined output of these terminals again is a logical AND function yielding "S₁ Output (Pattern C)" shown in FIG. 3. With this pattern, the combined output of terminals 1 and 4 is low for 4½ periods, high for ½ of a period, low for ½ of a period, high for ½ of a period, low for ½ of a period, high for ½ of a period, low for ½ of a period, high for ½ of a period, and then low for 4½ periods again, etc.

FIG. 3 also shows the power output patterns of the socket 112 for each of the three settings of switch S₁ and these output patterns are simply the inverse of the output patterns of the switch S₁. That is, when the output of switch S₁ is low, the power output of the socket 112 is high and vice versa.

The power output wave forms from the socket 112 are also controlled by transistor 156 which, in turn, is controlled by the output from terminal 5 of the integrated circuit 132. Thus, the transistor 156 is turned off during four periods because the output of terminal 5 is low and then turned on for four periods because the output of terminal 5 is high. When the transistor 156 is turned on, it conducts current from the coil 168 to the neutral line 124 so that the relay switch 120 is caused to open. With the relay switch 120 in the open position, of course the power output from socket 112 is low as indicated by portions 180, 182 and 184 of the three power output patterns shown in FIG. 3.

The output from terminal 6 is utilized as a reset signal to the reset input terminal 10 to reset the integrated circuit 132 and cause all of the outputs from the circuit to go high. After resetting, the integrated circuit 132 will not again produce the pulse train outputs defined above until a trigger signal (a voltage above a predetermined level) is applied to input terminal 11. If it is still sufficiently dark in the room in which the timing control device is located so that the voltage on the trigger input terminal 11 is above the predetermined threshold level, then such triggering will occur immediately upon resetting the circuit 132. If the room is sufficiently light so that the voltage on the trigger input terminal 11 is below the threshold level, then the circuit will not be triggered again until the room lighting is reduced (or until the light reaching the photocell 144 is somehow blocked out).

It is contemplated that the different power output patterns shown in FIG. 3 would occur through the dark hours of an evening and that the integrated circuit 132 would be reset to an idle condition throughout the daylight hours following the nighttime, until darkness again occurred. By changing the basic period T, the total time over which the power output patterns are developed is also changed. Thus, the setting of switch S₂ not only determines the duration of the individual times during which power is applied from the plug 110 to the socket 112 but also the overall cycle time over which the different patterns are developed prior to resetting the integrated circuit 132.

It should be noted that the integrated circuit 132 is adapted to continue and complete a timing cycle once triggered, even though additional trigger inputs are received.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A control circuit for controlling the supply of power to electrical appliances comprising
    a power input circuit for connecting to a power supply,
    a power output circuit for connecting to an electrical appliance,
    control means responsive to a certain signal for electrically coupling said input circuit and said output circuit, and responsive to the absence of said certain signal for electrically decoupling said input circuit from said output circuit, and
    signal generation means connected to said power input circuit for automatically and intermittently producing a plurality of said certain signals, said signal generation means including
    circuit means for producing a plurality of pulse trains of differing periodicity, and
    means for selectively combining various ones of the pulse trains to produce said certain signals which comprise spaced apart trains of pulses.

2. A control circuit as in claim 1 wherein said power input circuit comprises an alternating current plug, and wherein said power output circuit comprises an alternating current socket.

3. A control circuit as in claim 1 wherein said signal generation means is adapted to respond to a predetermined signal to produce said certain signals, and wherein said control circuit further includes photocell means for applying said predetermined signal to said signal generation means in response to the ambient light falling below a certain level.

4. A control circuit as in claim 1 wherein said control means comprises
    switch means coupled to said power input circuit and to said power output circuit and responsive to a control signal for conducting current from said power input circuit to said power output circuit, and control signal producing means responsive to said certain signals for applying control signals to said switch means.

5. A control circuit as in claim 4 wherein said switch means comprises a relay having
switch contacts, and
a coil responsive to control signals for controlling the opening and closing of said contacts, and
wherein said control signal producing means comprises a transistor whose emitter and collector electrodes are connected in series with said coil, and whose base electrode is connected to said signal generation means.

6. A control circuit as in claim 1 wherein said circuit means includes
a plurality of output terminals, to respective ones of which each of said plurality of pulse trains is applied, said circuit means being adapted to produce, when at least two of said output terminals are connected together, a pulse sequence which represents the logical AND function of the pulse trains produced on such output terminals,
a first input terminal for receiving a time-constant signal, the level of which determines the periods of said pulse trains,
a second input terminal for receiving a trigger signal to which said circuit means responds by producing said plurality of pulse trains,
time-constant signal producing means coupled to said power input circuit for producing and applying time-constant signals to said first input terminal, and
trigger signal producing means coupled to said power input circuit for producing and applying trigger signals to said second terminal, and
wherein said combining means comprises manual switch means for selectively connecting together various ones of said output terminals to thereby develop said pulse sequence.

7. A control circuit as in claim 6 further including rectifier means coupled to said power input circuit, and wherein said time-constant signal producing means includes manually variable-resistance means coupled between said rectifier means and said first input terminal for selectively varying the electrical resistance therebetween.

8. A control circuit as claim 7 wherein said trigger signal producing means comprises conductor means coupling said rectifier means to said second input terminal, and wherein said control circuit further includes photocell means coupled between said conductor means and said power input circuit for preventing application of trigger signals to said second terminal when the ambient light is above a certain level.

9. A control circuit as in claim 6 wherein said circuit means further includes first and second additional output terminals, and a third input terminal for receiving a reset pulse train which periodically resets said circuit means, said circuit means being adapted to produce and apply an additional pulse train and a reset pulse train respectively to said first and second additional input terminals, the periods of said additional and reset pulse trains being greater than the periods of any of said plurality of pulse trains, with the period of said reset pulse train being greater than the period of said additional pulse train, and said control circuit further comprising means coupling said second additional output terminal to said third input terminal.

10. A control circuit as in claim 9 wherein said control means comprises
switch means defining a circuit path between said power input circuit and said power output circuit and responsive to a control signal for opening the circuit path between said power input circuit and said power output circuit,
first means responsive to said pulse sequence for intermittently applying control signals to said switch means, and
second means responsive to said additional pulse train for intermittently applying control signals to said switch means.

11. A control circuit as in claim 10 wherein said switch means comprises a relay switch, wherein said first means comprises a first transistor whose emitter-collector circuit is coupled in series with said relay switch and whose base electrode is coupled to said manual switch means, and wherein said second means comprises a second transistor whose emitter-collector circuit is coupled in parallel with the emitter-collector circuit of said first transistor and whose base electrode is coupled to said first additional output terminal.

* * * * *